United States Patent Office 2,750,937
Patented June 19, 1956

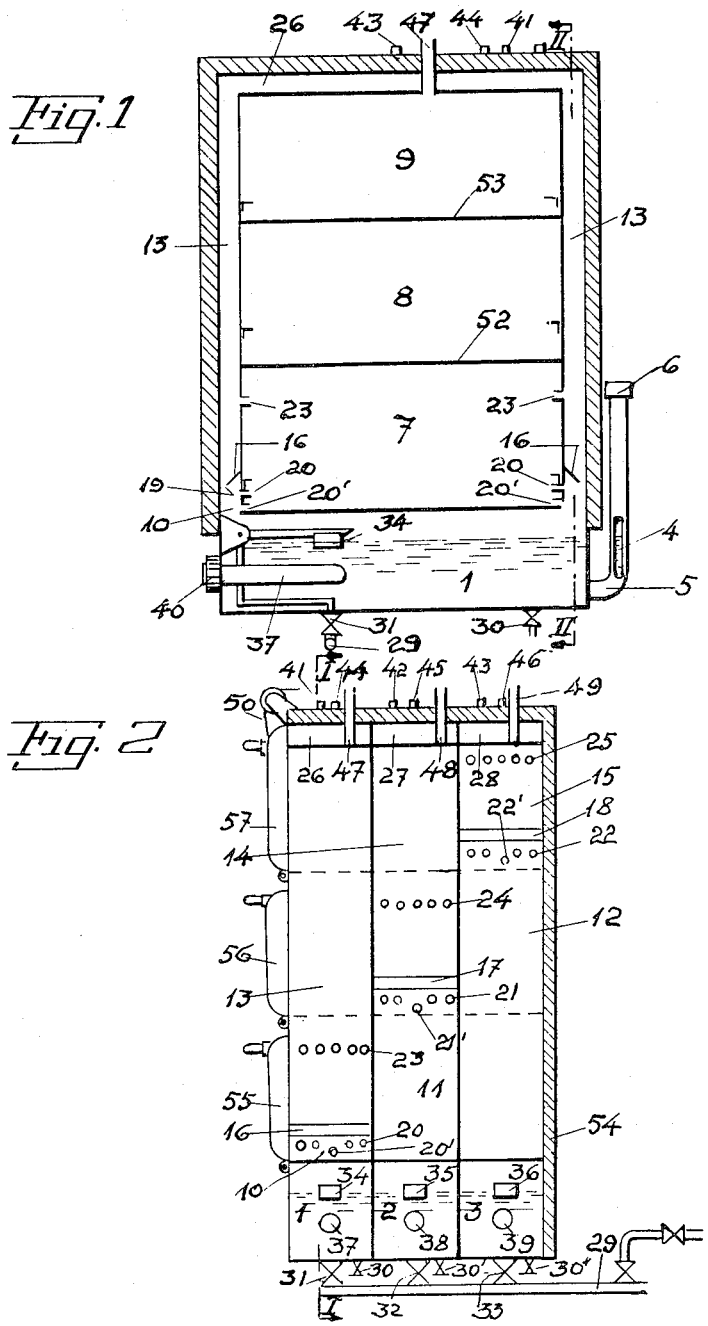

2,750,937

STEAM COOKING APPARATUS

Väinö V. Sjölund, Stockholm, Sweden

Application February 19, 1952, Serial No. 272,419

Claims priority, application Sweden February 19, 1951

3 Claims. (Cl. 126—369.2)

The present invention relates to a steam cooking apparatus which is operated with steam at about atmospheric pressure and is provided with a plurality of superposed chambers the one above the other, of which the lowermost serves as a water-chamber and those above serve as cooking chambers for different dishes, and in which to each cooking chamber steam is supplied from the water-chamber through apertures in the walls of the corresponding cooking chamber. A cooking apparatus according to the invention is characterized substantially by the feature that the water chamber is divided into a number of part-chambers corresponding to the cooking chambers, which part-chambers are entirely separated from each other and are disposed the one behind the other in relation to the front of the cooking apparatus, and whereas each part-chamber is connected to vertically disposed channels on both sides of the corresponding cooking chamber, which channels are mutually connected by means of horizontal connecting channels at the top of the cooking apparatus.

Further characteristics will be set forth in the following specification with reference to the accompanying drawing which schematically by way of example shows an embodiment of the invention. In the drawings: Fig. 1 is a section along the line I—I in Fig. 2, and Fig. 2 is a section along the line II—II in Fig. 1.

According to this embodiment the steam cooking apparatus consists of a water-chamber divided by vertical partition walls into entirely separate part-chambers or water-chamber parts 1, 2, 3, of which each is provided with a water gauge 5 with an inspection glass 4. The gauge is open at the top and may be covered with a cap 6. If desired, water can thus be filled up in the part-chambers through the gauges, at the same time as the water-level may be checked in each water-chamber part.

Above the said water-chamber parts 1, 2, 3, are disposed three cooking chambers 7, 8 and 9 respectively, to which are connected steam supply channels 10, 11 and 12 respectively and steam discharge channels 13, 14 and 15 respectively, see Figure 2. The steam supply and discharge channels are separated from each other by suitably inclined partition walls 16, 17 and 18, which, however, do not reach to the outerwalls of the channels, but form narrow slots 19, Figure 1, the purpose of which will be more particularly described in the following text.

In the walls of each cooking chamber below said inclined partition walls are disposed a number of apertures, shown in Figure 2 as a number of short mouth pieces 20, 21 and 22, of which at least one mouth piece 20', 21' and 22' respectively in each side wall is placed near the bottom of the cooking chamber, so that condensed water, which in the event of being collected in the cooking chamber, may flow off. In the upper portion of the side walls of each cooking chamber similar apertures or mouth pieces 23, 24 and 25 respectively are disposed for the steam discharge.

Above the uppermost cooking chamber, channels 26, 27 and 28 respectively are disposed which connect the steam discharge channels 13, 14 and 15 at the side walls of the cooking chambers.

Each part-chamber 1, 2, 3 is at its lower portion connected to a common conduit 29 for the supply of water, whereas also each part-chamber is provided with a discharge cock 30, 30' and 30" respectively for water. The water is supplied to each water-part-chamber automatically from the common conduit 29 through supply valves 31, 32 and 33 respectively, controlled by level regulators 34, 35 and 36, which according to the shown embodiment may consist of float-gauges. The conduit 29 is provided with a suitable non-return valve.

The valves 31, 32 and 33 co-operate with the float-gauges 34, 35 and 36 in such a manner that, if the water level in one of the chambers 1, 2 or 3 is not sufficiently high, the corresponding float-gauge will automatically open its valve, so that water may enter into the water-chamber until it has reached the required level, whereupon the valve again is closed automatically.

The water in the part-chambers is heated by means of electric heaters 37, 38 and 39 operated by switches 40, which in a known manner may be adapted for adjustment at different temperature ranges. The heating of the part-chambers may also be regulated by thermostats.

In order to prevent vacuum or excess of pressure in the conduit systems, in the different connecting channels 26, 27 and 28 a pair of valves is inserted, of which the valves 41, 42 and 43 will prevent vacuum, and the valves 44, 45 and 46 eliminate excess of pressure.

Since in steam cooking apparatus it is to be feared that an excess of pressure may prevail in a cooking chamber, each of these latter is provided with a valve 47, 48, 49 respectively, and each of these valves is, for instance by means of a wire or a cable 50, connected with preferably the handle of the door 55, 56 and 57 respectively of the different cooking chambers. By these means the last said valves will, when a handle of any door is operated, open at the same time so as to equalize the pressure, thus preventing the sudden escape of steam from the cooking chamber when opening the door.

Each of the cooking chambers of the cooking apparatus may, in a known manner, be provided with supports inside the walls for supporting an inserted additional bottom so that dishes placed in the cooking chamber may be exposed to the action of steam also from underneath.

Between the cooking chambers 7 and 8 and between the cooking chambers 8 and 9 dividing floors 52 and 53 are disposed, and on the sides all water-chambers and cooking chambers are enclosed with conveniently insulated side and rear walls 54, and on the front each cooking chamber is closed by the aforesaid flap doors 55, 56 and 57, which, of course likewise are properly insulated.

Before operating the steam cooking apparatus, it is placed on a convenient support or stand of suitable height. After having filled up water to the required level in the water-chambers, one or more of the electric heaters are switched on, which causes the heating of the water in the corresponding part-chamber to the desired degree. Dishes to be cooked are placed in the different cooking chambers, for instance fishes in the lowest chamber, meat in the next chamber, and vegetables in the uppermost chamber. After the water in the different part-chambers or water-chamber parts has commenced to boil, generated steam will enter through the lower inlets 20, 21 and 22 respectively into each cooking chamber, and flow through the same from both sides and escape again through the upper ports or outlets 23, 24 and 25 respectively. From these latter ports or outlets the steam will enter into the steam discharge channels 13, 14 or 15 and finally into the upper connecting channels 26, 27 or 28 respectively. Valves 44, 45 and 46 respectively, disposed in these channels will open at a certain predetermined pressure in the cooking chamber, which pressure is not allowed to be exceeded.

In normal conditions the steam will for the major part be condensed in the steam discharge channels 13, 14 and 15 and in the connecting channels 26, 27 and 28, so that only a small quantity will be discharged through the valves 44, 45 and 46. The condensed water will flow along the vertical steam discharge channels and be collected immediately above the inclined partition walls 16, 17 and 18, and finally flow through the narrow slots 19 into the corresponding part-chambers 1, 2 or 3.

When starting the apparatus, there will be perhaps in the beginning some steam escape through the slots 19, but as soon as sufficient condensate has come up, this will form a water-trap, so that the steam is forced to flow in the first instance through each cooking chamber in the above described manner.

The slots 19 may be substituted by narrow perforations in the inclined partition walls, which in this case extend closely to the outside walls.

Condensed water collected at the bottom of each cooking chamber will be discharged through the apertures 20', 21' and 22' to the appertaining water-chamber.

The cooking chambers may be provided with damper devices of any kind so as to regulate the passage areas of the inlets 20, 21 and 22 or for closing the same entirely so that dishes placed in any of the cooking chambers may be subjected to dry heat. Such a device will permit the use of the cooking apparatus as a warming box.

The invention shall not be limited to the embodiment with three cooking chambers as described above and shown in the drawing, but it shall comprise steam cooking apparatus with any number of water and cooking chambers, and any change may be made concerning the details in respect of design and disposal without departing from the spirit of the invention or limiting its scope.

What I claim is:

1. A steam cooking apparatus operable with steam at substantially atmospheric pressure comprising a plurality of chambers entirely separated from each other and disposed one above the other, the lowermost chamber serving as a water-chamber and the remaining chambers serving as cooking-chambers, said water-chamber being divided by vertical partition walls into entirely separate part-chambers, one behind the other in relation to the front side of said apparatus, a vertically disposed channel on each side of said cooking-chambers communicating a cooking-chamber with a corresponding part-chamber, their being a vertically disposed channel on each side of said cooking chambers for communicating a cooking-chamber with a corresponding part-chamber of said water-chamber, and horizontally disposed channels located above the uppermost cooking-chamber, said latter channels being entirely separated from each other, each of said latter channels serving as a connection between the vertically disposed channels on the sides of the cooking chambers communicating a cooking chamber with a corresponding part-chamber of said water-chamber.

2. A steam cooking apparatus according to claim 1, wherein each of said vertically disposed channels comprises a lower part and an upper part separated by a partition wall whereby the said lower part serves as an inlet channel for steam to the corresponding cooking-chamber and said upper part serves as an outlet channel for steam from the same cooking-chamber.

3. A steam cooking apparatus according to claim 2, wherein each of said cooking-chambers are provided with ports and wherein partition walls are provided between adjacent ones of said inlet and outlet channels for steam, said latter partition walls being disposed in proximity to and above the ports in corresponding cooking-chambers and being downwardly inclined towards the outer walls of said inlet and outlet channels whereby said outer walls and said latter partition walls form slots.

References Cited in the file of this patent

UNITED STATES PATENTS

| | | |
|---|---|---|
| 74,419 | Poole | Feb. 11, 1868 |
| 268,732 | Salmon | Dec. 5, 1882 |
| 332,283 | Parker | Dec. 15, 1885 |
| 513,405 | Messick | Jan. 23, 1894 |
| 534,634 | Coventry | Feb. 26, 1895 |
| 550,516 | Leigh | Nov. 26, 1895 |
| 850,824 | Eppley et al. | Apr. 16, 1907 |
| 1,820,325 | Rage | Aug. 25, 1931 |
| 2,392,038 | Gaylord | Jan. 1, 1946 |
| 2,452,790 | Pledger | Nov. 2, 1948 |
| 2,562,723 | Keller | July 31, 1951 |